C. L. BEGAS.
ELECTRICAL TESTING DEVICE.
APPLICATION FILED JUNE 8, 1918.

1,351,988.

Patented Sept. 7, 1920.

Inventor
Carl L. Begas
By his Attorney Walton Harrison

UNITED STATES PATENT OFFICE.

CARL LOUIS BEGAS, OF BROOKLYN, NEW YORK.

ELECTRICAL TESTING DEVICE.

1,351,988.   Specification of Letters Patent.   Patented Sept. 7, 1920.

Application filed June 8, 1918. Serial No. 238,884.

*To all whom it may concern:*

Be it known that I, CARL LOUIS BEGAS, a citizen of the United States, residing in Brooklyn, in the county of Kings and State of New York, have invented certain new and useful Improvements in Electrical Testing Devices, of which the following is a full, clear, and exact description.

My invention relates to electrical testing devices, of a type suitable for determining the condition of incandescent bulbs as well as electric horns, bells, etc., quickly, easily and with a minimum of apparatus.

More particularly stated, I seek to produce an electrical device having generally the form of a board provided with electrical connections and so constructed and adapted as to facilitate the testing of individual bulbs or the like, my device being particularly suitable for use in stores, salesrooms, garages and the like.

Reference is made to the accompanying drawing forming a part of this specification, and in which like reference characters indicate like parts in the different figures.

Figure 1:
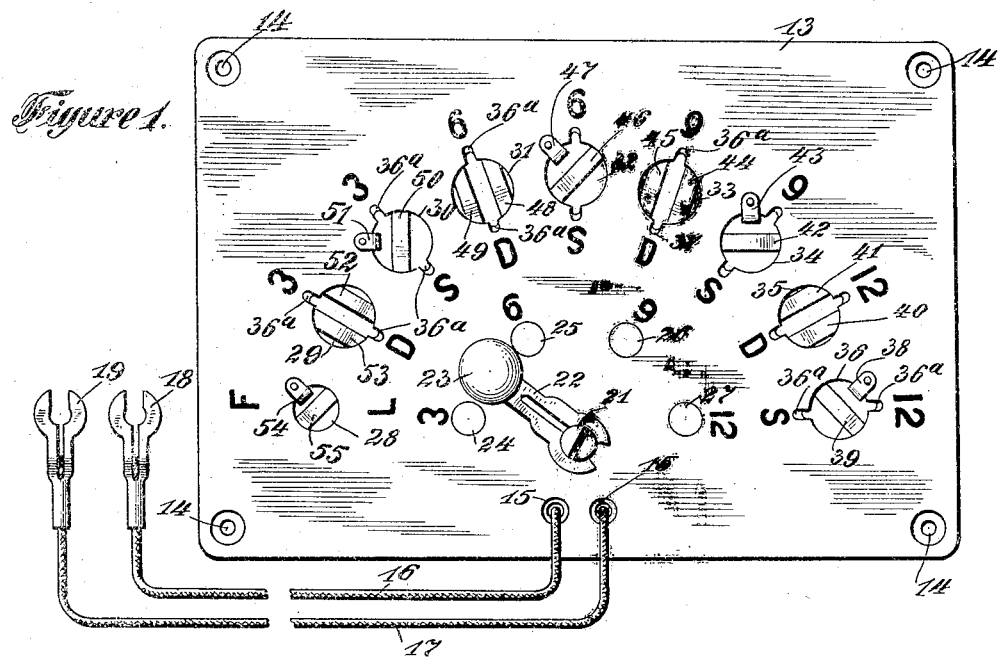
Figure 1 is a front elevation of my improved electrical testing device.
Figure 2:
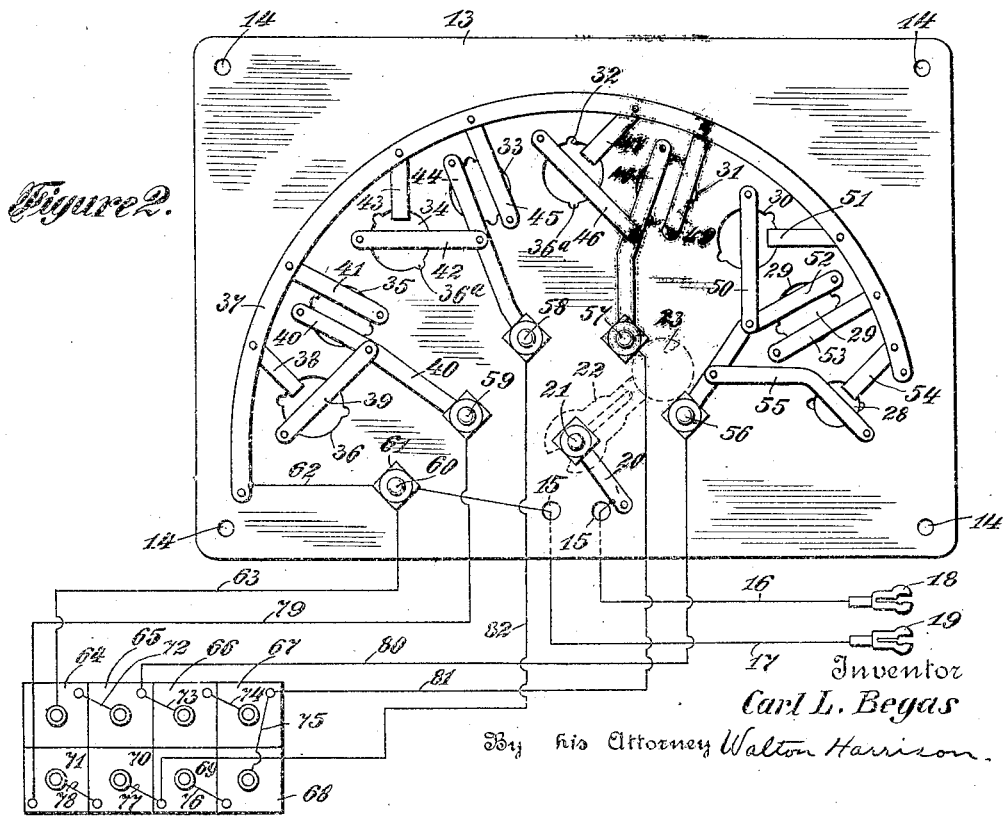
Fig. 2 is a rear view of the device, and is partly in elevation and partly diagrammatic, this view showing the battery and its connections.

A board is shown at 13, and is provided with corner holes 14 for receiving screws to hold the board upon a wall or upon a back slab, as desired. The board 13 is further provided with a pair of small holes 15 through which extend cords 16, 17, carrying terminal clips 18, 19, adapted for engagement with the binding posts of an electric horn, an electric bell or the like, to be tested. The cord 16 is connected with a strip 20 of sheet metal, the latter being secured to a post 21, upon which a switch arm 22 is mounted to swing or turn. The switch arm 22 carries a handle 23 whereby the operator actuates it by hand.

Adjacent the switch arm 22 are a number of contact buttons 24, 25, 26, 27, each so positioned that the switch arm can by a simple movement be brought into engagement with it.

The board 13 is further provided with a number of holes 28, 29, 30, 31, 32, 33, 34, 35, 36, arranged preferably in the form of a semicircle, as shown. Each of these holes except the one numbered 28 is provided with extending portions or slots 36$^a$. The slots just mentioned are to adapt the holes to receive bulbs of the type in which there are a pair of contact terminals extending laterally outward, like fins. The hole 28 is of smaller diameter than the other holes, and is used for testing bulbs of flash lamps. Such bulbs are relatively small. The hole 28 is not provided with slots.

The various holes numbered 28 to 36 inclusive are conveniently designated as lamp holes. They are severally designated by appropriate legends which appear in Fig. 1. The letters F L, adjacent the hole 28, indicate that this hole is for flash lamps; 3 D, adjacent the hole 29, means that this hole is for testing 3-volt bulbs, of the so-called "double" type; 3 S, adjacent the hole 30, means that this hole is associated with "single" bulbs of three volts; similarly, the various other legends 6 D, 6 S, 9 D, 9 S, 12 D and 12 S mean, respectively, six volts "double," six volts "single," nine volts "double," nine volts "single," twelve volts "double" and twelve volts "single." The legends 3, 6, 9, 12, associated with the contact buttons 24, 25, 26 and 27 refer to voltages associated with these buttons.

Mounted upon the board 13 and having the proximate form of a semicircle is a strip 37 of metal, serving as a distributing strip. Secured to it is a strip 38 of spring metal, serving as a contact strip, and for this purpose bent into the hole 36 and extending entirely through the same. Another strip 39, of spring sheet metal, extends diametrically across this hole 36. Two strips 40, 41, of spring sheet metal, extend across the hole 35, and are disposed parallel to each other and spaced equidistant from the axis of the hole. The strip 41 is connected with the strip 37, the strip 39 being secured to the strip 40. The system thus started is continued with reference to the other holes numbered 28 to 34 inclusive. Associated with the hole 34 are two strips 42 and 43, the strip 42 extending across the hole, in the same manner that the strip 39 extends across the hole 36, and the strip 43 extending through the hole 34, just as the strip 38 extends through the hole 36. The strip 42 is secured to a strip 44, and this strip and another strip numbered 45 extend across the hole 33. The strips 46, 47, 48 and 49 are arranged about the holes 32 and 31 in the same manner that the strips 42, 43, 44 and 45 are disposed about the holes 33 and 34. Similarly, strips 50, 51, 52 and 53 are arranged relatively to the holes 29 and 30. The strip 52 is connected to a strip 55, which extends across the hole 28, and a strip 54, connected to the distributing strip 37, extends through the hole 28.

The various strips extending across or through the different holes are so disposed that the insertion of a lamp into any one of the holes will bring the contact members of the bulb into engagement with the strips, which will thereupon be bent or distorted slightly in order to insure good contact.

The strip 52 is connected with a binding post 56, which extends through the board and carries the contact button 24. Similarly, the strips 48, 44 and 40 are connected severally with binding posts 57, 58, 59. Adjacent the binding post 59 is another binding post 60, used in connecting certain wires, as hereinafter described. Each binding post 56, 57, 58, 59 and 60 is provided with a revoluble nut 61, of the usual or any desired form. A wire 62 extends from the binding post 60 to the distributing strip 37, and from the binding post 60 a wire 63 leads to a battery cell 64. Along with this battery cell are others, 65, 66, 67, 68, 69, 70 and 71. These cells collectively make up the battery I use. Battery connectors are shown at 72, 73, 74, 75, 76, 77 and 78. I find that dry cells are in every way suitable for my purpose, but cells of any other kind may be employed instead, if desired.

From the cell 71 a wire 79 leads to the binding post 59, and from the cell 65 another wire 80 leads to the binding post 56. From the cell 67 a wire 81 leads to the binding post 57. A wire 82 leads from the cell 69 to the binding post 58.

Thus in effect the battery is subdivided, different groups of cells, representing different voltages, being apportioned off and associated with various groups of contact mechanism used for testing. The connections are so arranged that a lamp bulb mounted in any one of the lamp holes is subjected to voltage indicated approximately by the legends adjacent the hole. The connections associated with the switch arm 22 are so arranged that whenever the switch arm is moved into engagement with any one of the contact buttons 24, 25, 26 or 27, the difference of potential between the terminal clips 18, 19 is indicated approximately by the legend immediately adjacent the particular contact button upon which the switch arm for the moment is resting. Hence if the terminal clips 18, 19 have been previously connected to an instrument to be tested, such as an electric horn or bell, the operator can subject the instrument to any desired voltage indicated by the legends associated with the contact buttons.

The operation of my device is as follows: The parts being assembled and connected as above described, the operator uses the device for making tests of various kinds from time to time. Suppose he wishes to determine what voltage is suitable for a particular lamp bulb. If it is a single-contact bulb, he tries it first in the hole 30. If the lamp now glows brightly, he knows from the legend 3 that the voltage suitable for the lamp is 3. If, however, the bulb does not glow brightly, he moves it to the hole 32. If it here glows properly, the voltage is of course 6. If the glow is not bright the operator moves the bulb to the hole 32 and another reading is made, the voltage being 9 if there is a proper glow. If there is not, the bulb is tried in the hole 36, for 12 volts.

Similarly if the bulb is provided with double contact members it is tested in one, two or more of the holes 29, 31, 33 and 35, the voltage being indicated by the legends 3, 6, 9 and 12.

If the bulb is a small one, of the kind used for flash lights, it is placed in the hole 28, and its condition determined by the resulting glow, if any. If there be no glow this is an indication that the bulb is out of order.

If the capacity of the bulb in volts is already known, and the operator wishes merely to test the condition of the bulb, he inserts it in the appropriate hole and notes the resulting glow, if any.

In order to test an electric horn or bell, or any similar instrument, in order to ascertain the voltage suitable for it, or to ascertain its condition, the operator connects the terminal clips 18, 19 with it, and moves the switch arm 22 as above described, and by noting the sound given off by the instrument and observing the legend associated with the position of the switch arm, the test is complete.

I do not limit myself to the precise mechanism shown, the scope of my invention being commensurate with my claims.

I claim—

1. An electrical testing device, comprising a board provided with holes for receiving lamp bulbs to be tested, contact strips mounted upon said board for engaging contact members carried by said lamp bulbs, a battery made up of a plurality of cells connected together, and conductors extending from said contact strips to different cells of said battery.

2. An electrical testing device, comprising a board provided with lamp holes and with contact strips associated with said lamp holes, a battery made up of separate battery cells connected together, and a number of conductors extending from different cells of said battery to different contact strips associated with different holes, in order to virtually subdivide said battery relatively to said holes.

3. An electrical testing device, comprising a board provided with a number of lamp holes having contact mechanism for single contact lamps and with a number of lamp holes having contact mechanism for double contact lamps, a battery made up of a number of cells connected together, contact strips for said holes, and connections from said contact strips to different cells of said battery, said connections being so distributed as to virtually subdivide said battery among said lamp holes.

4. An electrical testing device, comprising a board provided with a number of lamp holes and with contact strips leading to said lamp holes and arranged in pairs, one pair to each lamp hole, a battery made up of a number of cells connected together, connections from different pairs of said contact strips to different parts of said battery, for the purpose of virtually subdividing said battery, a hand switch mounted upon said board and provided with a plurality of contact buttons, a pair of conductors connected with said switch and adapted for connection with an instrument to be tested, so that said instrument may be energized by aid of any one of said contact buttons chosen at the will of the operator, and a number of separate conductors each extending from one of said contact buttons to some part of said battery, in order to virtually subdivide the energy of the battery among said contact buttons.

5. In an electrical testing device the combination of a board provided with lamp holes and with a hand switch, conductors connected to said switch for energizing therefrom an instrument to be tested, a battery made up of cells connected together, connections from said lamp holes to said battery, said connections being so distributed as to subdivide the strength of said battery among said lamp holes, and a number of other connections from different parts of said battery to different parts of said switch, in order to enable said switch to control, independently of each other, different portions of said battery.

CARL LOUIS BEGAS.